(12) United States Patent
Muijs

(10) Patent No.: US 8,860,718 B2
(45) Date of Patent: *Oct. 14, 2014

(54) METHOD FOR CONVERTING INPUT IMAGE DATA INTO OUTPUT IMAGE DATA, IMAGE CONVERSION UNIT FOR CONVERTING INPUT IMAGE DATA INTO OUTPUT IMAGE DATA, IMAGE PROCESSING APPARATUS, DISPLAY DEVICE

(71) Applicant: Koninklijke Philips N.V., Eindhoven (NL)

(72) Inventor: Remco Theodorus Johannes Muijs, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,612

(22) Filed: Nov. 12, 2013

(65) Prior Publication Data

US 2014/0071348 A1  Mar. 13, 2014

Related U.S. Application Data

(63) Continuation of application No. 13/254,191, filed as application No. PCT/IB2010/050905 on Mar. 3, 2010, now Pat. No. 8,605,083.

(30) Foreign Application Priority Data

Mar. 6, 2009 (EP) .................................... 09154549

(51) Int. Cl.
*G06T 15/00* (2011.01)
*G09G 5/00* (2006.01)
*G06K 9/40* (2006.01)
*G06T 5/00* (2006.01)
*H04N 5/265* (2006.01)
*G06T 5/40* (2006.01)

(52) U.S. Cl.
CPC ...... *H04N 5/265* (2013.01); *G06T 2207/20028* (2013.01); *G06T 5/007* (2013.01); *G06T 2207/20208* (2013.01); *G06T 2207/10016* (2013.01); *G06T 5/40* (2013.01)
USPC ............................ 345/419; 345/617; 382/264

(58) Field of Classification Search
None
See application file for complete search history.

(56) References Cited

U.S. PATENT DOCUMENTS

| 4,733,229 | A | * | 3/1988 | Whitehead ...................... 345/20 |
| 4,825,297 | A | * | 4/1989 | Fuchsberger et al. ......... 358/447 |
| 6,078,686 | A | * | 6/2000 | Kim ............................. 382/167 |

(Continued)

OTHER PUBLICATIONS

"Enhancement of Bright Video Features for HDR Displays" Didyk et al. Eurographics Symposium on Rendering 2008, vol. 27.*

(Continued)

*Primary Examiner* — David Zarka
*Assistant Examiner* — Khoa Vu

(57) ABSTRACT

In a method, unit and display device, the input image signal is split into a regional contrast signal and a detail signal, followed by stretching separately the dynamic ranges for at least one of the signals. The dynamic range for the regional contrast signal is stretched with a higher stretch ratio than the dynamic range for the detail signal. The stretch ratio for the detail signal may be near 1 or 1. Further, highlights are identified, and for the highlights the dynamic range is stretched to an even higher degree than for the regional contrast signal.

20 Claims, 8 Drawing Sheets

(56) References Cited

U.S. PATENT DOCUMENTS

| | | | |
|---|---|---|---|
| 6,556,258 | B1 | 4/2003 | Yoshida et al. |
| 8,144,927 | B2 | 3/2012 | Zuro |
| 8,207,931 | B2 * | 6/2012 | Zhang et al. ........... 345/102 |
| 8,373,898 | B2 | 2/2013 | Bonnier et al. |
| 2007/0159316 | A1 | 7/2007 | Mischel et al. |
| 2007/0181777 | A1 | 8/2007 | Drummon et al. |
| 2009/0015736 | A1 | 1/2009 | Weller et al. |
| 2012/0314129 | A1 | 12/2012 | Mertens |

OTHER PUBLICATIONS

Search NPL on Google Scholar.*
Yamasakia et al: "Denight: Nighttime Image Enhancement Using Daytime Image"; Proc. SPIE Optomechatronic Technologies, Proc. of SPIE, vol. 7266, Nov. 17, 2008, pp. 1-9.
Didyk et al: "Enhancement of Bright Video Features for HDR Displays"; Eurographics Symposium on Rendering, vol. 27, No. 4, Sep. 10, 2008, pp. 1265-1274.
Meylan et al: "Tone Mapping for High Dynamic Range Displays"; Proc. of SPIE-IS&T Electronic Imaging, Human Vision and Electronic Imaging XII, vol. 6492, Jan. 29, 2007, pp. 649210-1-649210-12.
Nayar et al: "Lighting Sensitive Display"; ACM Transactions on Graphics, vol. 23, No. 4, Oct. 13, 2004, pp. 963-979.
Paris et al: "A Gentle Introduction to Bilateral Filtering and Its Applications"; International Conference on Computer Graphics and Interactive Techniques-ACM SIGGRAPH 2007 Courses, Aug. 5, 2007, pp. 1-45.
Wang et al: "High Dynamic Range Image Hallucination"; Erographics Symposium of Rendering (2007), Eurographics, Sep. 3, 2007, pp. 1-7.
Rempel et al: "Ldr2HDRdr On-The-Fly Reverse Tone Mapping of Legacy Video and Photographs"; ACM Transactions on Graphics, vol. 26, No. 3, Jul. 4, 2007, pp. 39-1-39-6.
Durand et al: "Fast Bilateral Filtering for the Display of High-Dynamic-Range Images"; ACM Transactions on Graphics, vol. 21, No. 3, Jul. 1, 2002, pp. 257-266.
Seetzen et al: "High Dynamic Range Display Systems"; ACM SIGGRAPH Conference Proceedings, 2004, pp. 760-768.
Devlin et al: "Tone Reproduction and Physically Based Spectral Rendering"; Eurographics 2002, 23 page Document.
Tumblin et al: "Two Methods for Display of High Contrast Images"; ACM Transactions on Graphics, vol. 18, No. 1, Jan. 1999, pp. 56-94.
Stockham, T.: "Image Processing in the Context of a Visual Model"; Proceedings of the IEEE, Jul. 1972, vol. 60, No. 7, pp. 828-841.
Sondhi, M.:"Image Restoration: The Removal of Spatially Invariant Degradations"; Proceedings of the IEEE, vol. 60, No. 7, Jul. 1972, pp. 842-849.
Li et al: "Compressing and Companding High Dynamic Range Images With Subband Architectures"; The Association for Computing Machinery, Inc, ACM 2005, pp. 836-844.
Chen et al: "Real-Time Edge-Aware Image Processing With the Bilateral Grid"; ACM Transactions on Graphics, vol. 26, No. 3, Article 103, Jul. 2007, pp. 103-1-103-9.
Ward Et : "JPEG-HDR: A Backwards-Compatible, High Dynamic Range Extension to JPEG"; SIGGRAPH '05 ACM SIGGRAPH 2005 Courses, pp. 1-8.
Tomasi et al: "Bilateral Filtering for Gray and Color Images"; Proceedings of the 1998 IEEE International Conference on Computer Vision, Bombay, India, 8 page Document.

* cited by examiner

METHOD FOR CONVERTING INPUT IMAGE DATA INTO OUTPUT IMAGE DATA, IMAGE CONVERSION UNIT FOR CONVERTING INPUT IMAGE DATA INTO OUTPUT IMAGE DATA, IMAGE PROCESSING APPARATUS, DISPLAY DEVICE

CROSS-REFERENCE TO RELATED APPLICATIONS

This application is a continuation of prior U.S. patent application Ser. No. 13/254,191, filed Sep. 1, 2011, which is a national application, of PCT Application No. PCT/IB2010/050905, filed Mar. 3, 2010 and claims the benefit of European Patent Application No. 09154549.1, filed Mar. 6, 2009, the entire contents of each of which are incorporated herein by reference thereto.

FIELD OF THE INVENTION

The invention relates to a method for converting input image data into output image data.

The invention further relates to an image conversion unit for converting input image data into output image data.

The invention further relates to an image processing apparatus comprising:
receiving means for receiving input image data,
an image conversion, unit for converting input image data into output image data.

The invention further relates to a display device comprising an image processing apparatus comprising:
receiving means for receiving input image data,
an image conversion unit for convening input image data into output image data.

BACKGROUND OF THE INVENTION

To enable an acceptable representation of high-dynamic range (HDR) imagery on a display with a dynamic range that is typically several orders of magnitude lower, the dynamic range of recorded video sequences is usually compressed by means of tone-mapping during acquisition and transmission. The dynamic range of many outdoor scenes can be as large as 12 orders of magnitude, whereas most liquid crystal displays (LCDs) merely offer a static contrast ratio of about 3 orders of magnitude. As a result severe dynamic range compression is required in the early stages of the imaging pipeline to enable a pleasant representation of the scene on a LDR (low dynamic range) display. Using simple techniques usually has the drawback that the contrast of small details can be compromised or even lost.

To address these shortcomings, more advanced adaptive methods have been developed. These methods predominantly compress large-scale contrasts while preserving the contrast of fine details.

This approach performs well as long as the display system's capabilities remain more or less similar to those anticipated during compression in the early stages of the imaging pipeline. However, with new high-dynamic-range display systems, static contrast ratios of up to 6 orders of magnitude can be achieved. Moreover, such display systems may be capable of locally (in time or space) producing a very high peak brightness. For example, this can be achieved by 2D dimmable LED backlights, where the power saved by dimming some LEDs underneath dark image portions may be used to boost other LEDs underneath bright regions. An extension of the input LDR image data into a HDR image signal has been found to often result in an unnatural appearance of the scene.

SUMMARY OF THE INVENTION

It is an object of the invention to provide a method, conversion unit and image processing apparatus with an aim of increasing the quality of reproduction and providing a more pleasant and natural appearance of images.

To this end the method in accordance with the invention is characterized in that
The input image data is converted into at least two signals, a first signal providing regional contrast data and a second signal providing detail data,
The dynamic range of at least the first signal is stretched, wherein dynamic range of the first signal is stretched to a higher degree than the dynamic range of the second signal,
The stretched first and second signals are combined is an output signal.

The inventor has realised that the problems arise out of an imbalance between local and regional contrast. Preservation of detail contrast during dynamic range compression during acquisition in combination with an overall dynamic range extension during or prior to display results in an enhancement of fine details relative to regional contrasts in the displayed image. The regional contrast data comprises relatively low spatial frequency information. The detail data comprises higher spatial frequency information.

For considerable extension factors, this results in an unnatural appearance of the scene and could also lead to an undesired amplification of analog and digital noise.

A possible solution would be to use, during range extension, the mathematical inverse of the mapping operator used during range compression to retrieve the original HDR scene. This, however, would require knowledge of the used compression method, which would have to be included in the input signal. However, in practice, we often have to deal with legacy LDR video without knowledge of how its dynamic range was compressed during acquisition and encoding. This 'perfect' solution is thus often not practical. Apart from this aspect, the receiving unit would have to be able to match various possible compression methods.

The present invention provides a more balanced LDR to HDR conversion of the input image data into an output signal.

The input signal is split into a first signal providing regional, semiglobal data and a second signal providing the details. The first signal can for instance be made by low pass filtering the input signal, including low pass filtering methods which preserve edge features, such as for instance bilateral filtering. The second signal providing details can be made by e.g. subtracting the first signal from the input data signal.

At least the first signal is stretched, i.e. the dynamic range of at least the first signal is extended. The two signals are differently stretched, wherein the second signal is stretched to a smaller degree than the first signal. This reduces the unnatural visible enhancement of fine details relative to regional contrasts, resulting in a more natural appearance of the scene. To some extent noise is also subdued. In preferred embodiments the second signal is not stretched. If during the original compression the details were preserved, the second signal providing detail information need not be stretched. This is a relatively simple embodiment allowing a simplification of the algorithm.

In preferred embodiments the dynamic range of the combined stretched first and second signal is bound by an upper value. This upper value may be lower than the maximum allowable signal on the display. The input image signal is further analyzed to identify groups of pixels forming highlights in the image and wherein the pixel data for said identified groups of pixels are converted into a third signal such that the third signal covers a dynamic range extending to above the said upper value to a upper maximum pixel value and wherein the third signal is combined with the combined stretched first and second signal.

The signal comprising the stretched first and second signal has a dynamic range which is bound by an upper value. In the preferred embodiment above said upper value and to a maximum value, an upper dynamic range of pixel values is reserved for displaying highlights.

It has been found that, especially for very high luminance displays, the maximum achievable intensity is so high that the viewer, in a sense, becomes blinded by the light. In moderate cases, the viewer will only perceive the bright spots and will not, or only to a very limited extent, be able to perceive the darker details of the scene. In extreme cases, however, this can be painful or even harmful for the viewers' eyes. By limiting the range to which the combined first and second signal is stretched, this is avoided. However, this does not make full use of the possibilities of HDR displays. In preferred embodiments the maximum luminance is kept below the possibilities of a high luminance device. By identifying highlights in the image and placing their pixel values in the highest part of the dynamic range of the display, these highlights are brought to the forefront without blinding the viewer thereby providing a very crisp and clear image. In an embodiment the highlights are identified by selecting groups of pixels with pixel value in a range close to or at the upper value of the LDR range, wherein in a neighborhood of a high pixel value pixel the number of high pixel value pixels is below a threshold, i.e. for small groups of high intensity pixels.

Highlights are relatively small groups of high intensity pixels. The dynamic range of the display device above the upper value is populated by the highlights. This has shown to provide a high quality image wherein, on the one hand, the details are not unnaturally enhanced, or bright blinding spots appear in the image, while, on the other hand, the highlights imaged at the high end of the display range provide for a sparkling and crisp image.

In preferred embodiments the upper value of the dynamic range for the combined stretched first and second signal lies in a range corresponding to light intensities when displayed on a display of 500 to 1000 Nit, and the upper maximum pixel value lies in a range corresponding to light intensities when displayed on a display of above 1000 Nit, preferably above 2500 Nit.

These and further aspects of the invention will be explained in greater detail by way of example and with reference to the accompanying drawings, in which

BRIEF DESCRIPTION OF THE DRAWINGS

The Figures are not drawn to scale. Generally, identical components are denoted by the same reference numerals in the figures.

DETAILED DESCRIPTION OF PREFERRED EMBODIMENTS

Figure 1:
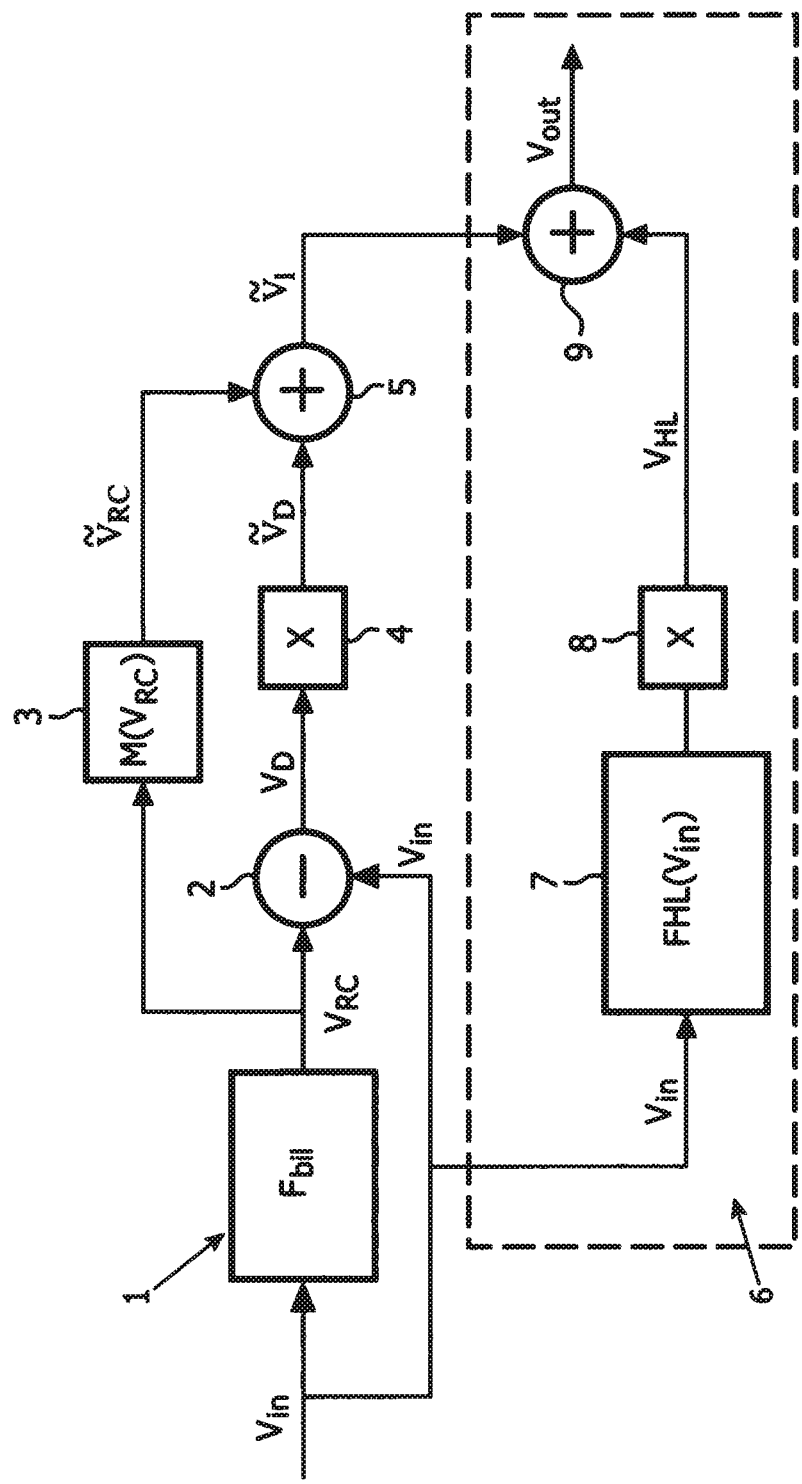
FIG. 1 provides a schematic flow chart for an embodiment of the invention.

It is remarked that below examples are shown.

The dynamic range of many outdoor scenes can be as large as 12 orders of magnitude, whereas most liquid crystal displays (LCDs) merely offer a static contrast ratio of about 3 orders of magnitude. As a result, severe dynamic range compression is required in the early stages of the imaging pipeline to enable a pleasant representation of the scene on a LDR (low dynamic Range) display. The most straightforward approach to dynamic range compression is by means of global tone-mapping operators. However, the main drawback of these simple techniques is that the contrast of small details can be compromised. To address these shortcomings, more advanced methods have been developed compress regional (large-scale) contrasts while preserving the contrast of fine details.

On conventional LDR (low-dynamic range) display screens, the contrast of the imagery is usually stretched to the full capabilities of the display device (i.e. 0 to black, 255 to white for an 8-bit system), subject to user preference, sometimes supported by a histogram stretch prior to display. This approach performs well as long as the display system's capabilities remain more or less similar to those anticipated during compression in the early stages of the imaging pipeline. However, in new HDR (high-dynamic-range) display systems static contrast ratios of up to 6 orders of magnitude are achieved. Moreover, such display systems may be capable of locally (in time or space) producing a very high peak brightness. For example, this can be achieved by 2D dimmable LED backlights, where the power saved by dimming some LEDs underneath dark image portions may be used to boost other LEDs underneath bright regions.

When displaying legacy LDR video directly on a HDR display, an artifact occurs, namely imbalance between local and regional contrast.

Preservation of detail contrast during range compression in combination with a range extension prior to display, results in an enhancement of fine details relative to regional contrasts. For large extension factors, this results in an unnatural appearance of the scene and sometimes an undesired amplification of noise.

In the method in according with the invention the input image data is converted into at least two signals, a first signal providing low spatial frequency regional contrast data and a second signal providing high spatial frequency detail data. The dynamic range of at least the first signal is stretched, wherein the dynamic range of the first signal is stretched to a higher degree than the dynamic range of the second signal. The stretched first and second signals are combined in the image output signal.

The first signal provides a regional contrast signal and the second signal provides a detail layer. The two signals are separately stretched, wherein the first signal is stretched more than the second signal. In effect a regional stretch of the regional contrast signal is performed, for instance by low pass filtering. Upon this stretching the local detail is stretched but to a lower degree. The two signals are combined. This reduces, compared to an overall stretch of the incoming signal, the imbalance between detail and regional image is reduced. In preferred embodiments the second signal is made by subtracting the first signal from the input image data.

FIG. 1 illustrates a flow diagram for an exemplary algorithm in accordance with the invention.

The algorithm performs dynamic range extension as a dual signal procedure. Initially, regional contrasts are extracted from the input signal $V_{in}$ by applying, in this example, a low-pass filter 1 to the video, providing a first signal regional contrast signal $V_{RC}$, and extracting a detail layer from the input signal $V_{in}$, providing a second detail signal $V_D$. In this example $V_D$ extracted by computing the difference between the regional contrasts and the input in subtracter 2:

In formula:

$$V_{RC}=F_{bil}(V_{in}),$$

$$V_D=V_{in}-V_{RC},$$

where $V_{in}$ denotes the input video and $F_{bil}$ denotes the application of low pass filter, preferably a fast bilateral filter. Preferably bilateral filtering using a bilateral grid as the low-pass operator is executed. This approach provides a computationally efficient approximation to the full bilateral filter. The main benefit of this method is that it provides a cheap edge-preserving blur filter, thus preventing halo artifacts often associated with linear spatial filter kernels. Bilateral filtering using the bilateral grid can effectively be summarized as (1) constructing local histograms, (2) applying a multidimensional linear filter kernel to these histograms and (3) slicing (=interpolating) the desired output pixels. Although preferred, it should be noted that the bilateral grid does not represent an essential part of the current invention. Regional contrasts can alternatively be extracted using conventional (banks of) low-pass filters. Instead of using a mathematical algorithm to generate the first and second signal other methods can also be used such as for instance predefined special classes e.g. dark room interior.

To reduce the imbalance between regional and detail in an image of high luminance and maintain a natural balance between the fine detail and regional contrast when applying dynamic range extension, the two signals $V_{RC}$ and $V_D$ are mapped separately. One preferred way of doing so is by stretching the regional contrast $V_{RC}$ linearly from the input dynamic range $[K_{LDR}\text{-}W_{LDR}]$ to a pre-defined target dynamic range $[K_0\text{-}W_0]$ which could depend on the display capabilities, the human eye capabilities or personal preference:

$$\tilde{V}_{RC}=(V_{RC}-K_{LDR})\cdot\frac{(W_0-K_0)}{(W_{LDR}-K_{LDR})}+K_0.$$

Wherein $\tilde{V}_{RC}$ is the stretched signal. Such predefined target dynamic range can be set by the manufacturer. $W_0$ defines the upper value of the dynamic range for the combined signal. In FIG. 1 the stretching of the first signal $V_{RC}$ is schematically illustrated by $M(V_{RC})$ where M stands for a stretching operation of which the above formula is an example in which linear stretching is used. Non-linear stretching using other formulas for mapping are also possible, for this stretching or mapping step, as well as for any other stretching or mapping step.

The stretching operation provides a range extension. Grosso modo foe stretching of the dynamic range is a factor $$\frac{(W_0-K_0)}{(W_{LDR}-K_{LDR})}$$

being the ratio for the input dynamic range ($W_{LDR}\text{-}K_{LDR}$* and the target dynamic range, i.e. the amount of stretching applied to the first regional contrast signal. The stretching is performed in stretcher 3. The stretcher 3 maps the incoming data $V_{in}$ with an incoming dynamic range ($W_{LDK}\text{-}K_{LDR}$) onto a stretched dynamic range ($W_0\text{-}K_0$).

In the above preferably $W_0<W_{HDR}$ where $W_{HDR}$ is the maximum range of the display, thereby keeping the pre-defined target dynamic range below the maximum display dynamic range. This prevents that large bright areas will be imaged/rendered at unpleasantly high luminances.

Preferably $W_0$ is in the range corresponding to a luminance in the range of 500 to 1000 Nit.

Second, the detail layer signal is enhanced by applying a moderate, compared to the stretching factor of the first signal enhancement factor $g_D$ in enhancer 4:

$$\tilde{V}_D=g_DV_D$$

$\tilde{V}_D$ is the stretched second signal comprising the details. Preferably the gain $g_D$ is close to 1, for instance in the range between 1 and 1.2, or simply 1, in the latter case the detail layer data $V_D$ is left as it is, without enhancement, which is a simple preferred embodiment. In many legacy compressed LDR signal, the compression is performed which more or less maintain contrast in details. Thus, leaving the detail layer unaffected i.e. applying a gain factor of 1 is often sufficient and reduces the complexity of the algorithm.

Obviously, extension functions $M(V_{RC})$ and $g_D$ other than the above simple linear scaling can be used, such as power functions or S-functions. Finally, an output is constructed by combining the mapped detail and regional contrast layers, i.e. the stretched first and second signal:

$$\tilde{V}_1=\tilde{V}_D+\tilde{V}_{RC},$$

$\tilde{V}_1$ is the combined stretched first and second signal. In this example this is done by combining the stretched first and second signal in combiner 5, in this example a simple adder.

This aspect of the invention improves the displayed image by reducing the visible mismatch between regional contrast and detail contrast after increase of the dynamic range of the input signal.

A further problem occurring in HDR display is that the peak brightness of new HDR displays is very high (e.g., the DR37-P by Brightside/Dolby is reported to have a peak brightness of over 3000 cd/m2). Consequently, stretching the signal during display to the full dynamic range may result in unpleasantly bright scenes for some images. The range to which the input is stretched can be limited for instance to between 500 and 1000 Nit, to avoid such unpleasant scenes but in this case the displays' capabilities are not fully exploited.

To address tins issue, in preferred embodiments of the invention a further step is added to the algorithm. This preferred step is schematically shown in rectangle 6 in FIG. 1.

In order to take full advantage of an HDR displays' capabilities, small specular highlights are identified with which the remaining available dynamic range, i.e. the range $W_0$ to $W_{HDR}$ is populated (highlighting). Preferably bilateral grids are used, also as a form of low pass filter. Since bilateral grids involve constructing local histograms, these histograms can be used directly to identify regions with a small number of bright pixels. The algorithm to perform identification of highlights is in FIG. 1 schematically shown as function $FHL(V_{in})$ in identifier 7. The data of the pixels that are identified as belonging to highlights are enhanced by a factor in mapper 8 that brings them into the highest dynamic range, providing a signal $V_{HL}$ highlighting small bright areas. The signals $\tilde{V}_1$ and $V_{HL}$ are combined in combiner 9 to provide an output signal $V_{out}$. Mapping can be done by simple multiplication or by more complex functions.

Figure 2:
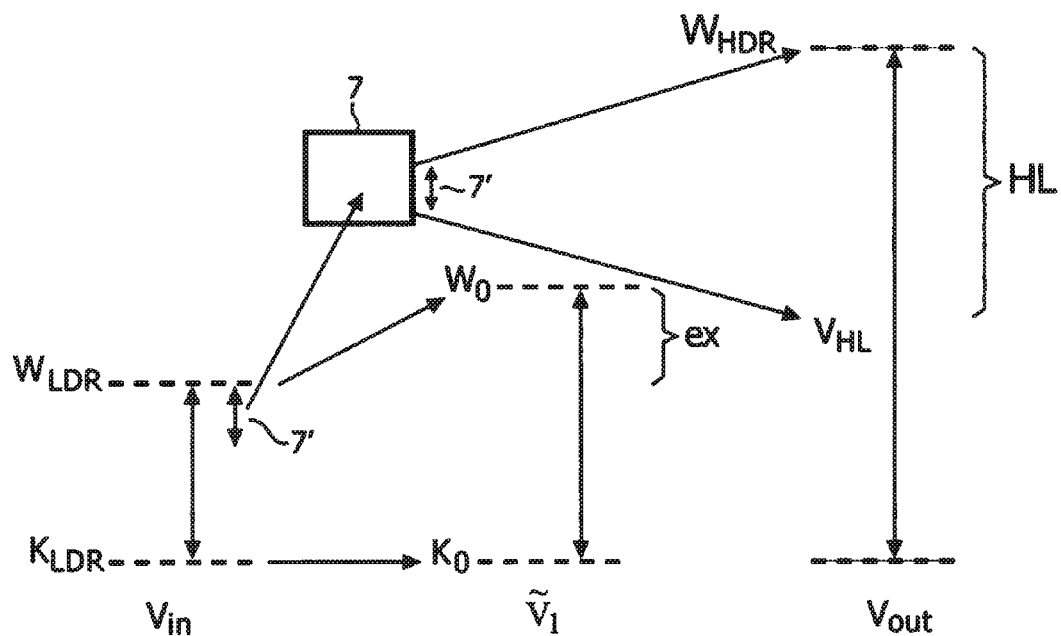
FIG. 2 illustrates extension of dynamic ranges.

FIG. 2 schematically illustrates the various dynamic range enhancements. The input signal $V_{in}$ has a dynamic range ranging from $K_{LDR}$ to $W_{LDR}$ This is mapped into a dynamic range ranging from $K_0$ to a $W_0$. Apart from that pixels that are identified as belonging to highlights, which include pixels in the highest input range, in FIG. 2 schematically indicated by arrow 7', are identified by the highlight identifier 7; for the pixels that are identified as belonging to highlights a mapping operation in mapper 8 is performed wherein the data for the highlights is mapped onto a larger dynamic range, covering in particular the highest range of luminance HL, e.g. corresponding to the top part of the full dynamic range of an HDR display device. This highest range of luminance, reserved for highlights, is stretched to a maximum value $W_{HDR}$. This maximum value lies above the upper value $W_o$ of the target dynamic range, which target range is kept to moderate luminance values to avoid unpleasant viewing conditions. "Ex" in FIG. 2 illustrates schematically the extension of the dynamic range for $\tilde{V}_\tau$, "HL" schematically illustrates the higher dynamic range reserved for the highlights signal $V_{HL}$.

Figure 3:
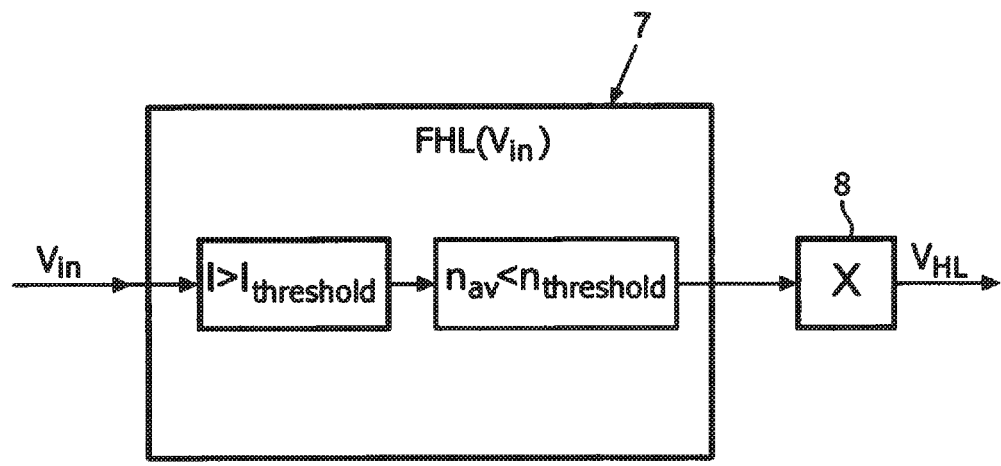
FIG. 3 illustrates a highlight identification algorithm.
Figure 4:
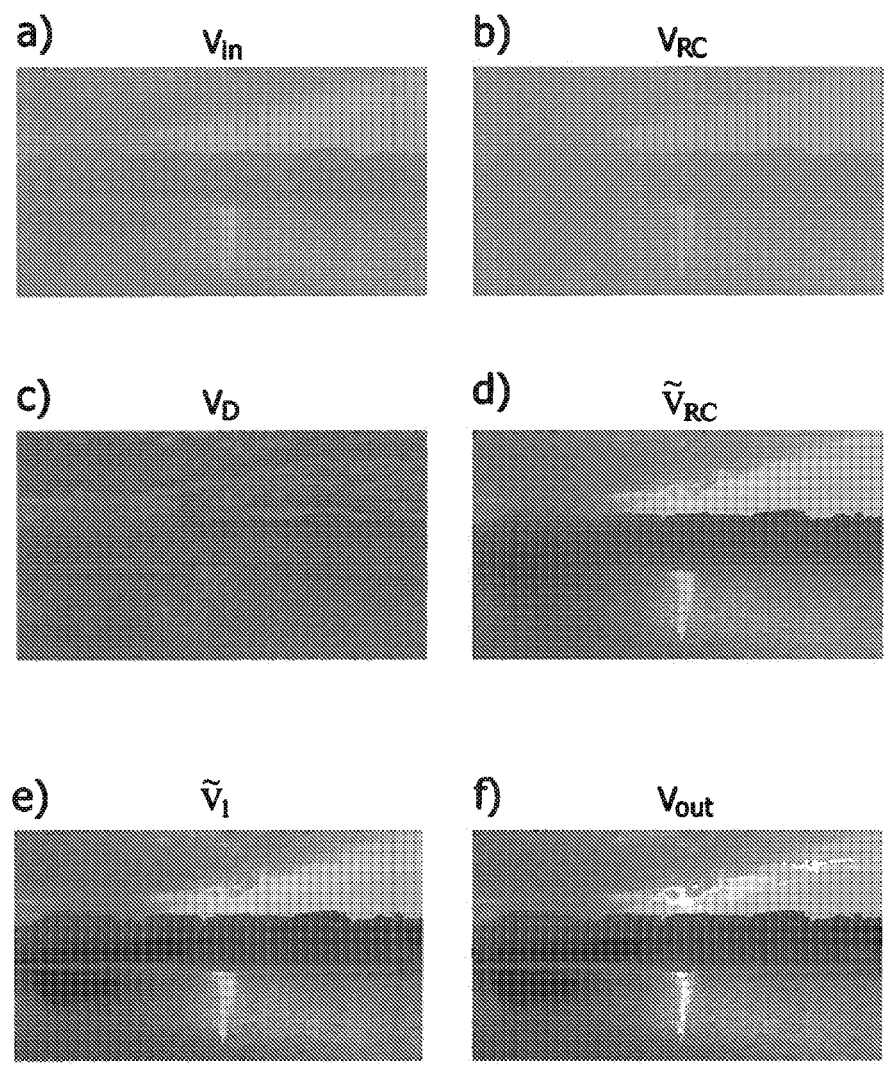
FIGS. 4a to 4f illustrate the effects of a dynamic range extension algorithm according to the invention.

FIG. 3 illustrates a highlight identification algorithm.

The input signal is sent to the identifier 7. Those areas or blocks with pixels having a luminance I above a threshold value $I_{threshold}$ and a number $n_{nv}$ of such high intensity pixels below a threshold $n_{threshold}$ are identified as highlights. Further examples are given below.

As an example the following procedure can be followed:
To include highlighting in the processing flow, the intensity of the bilateral grid constructed on the input signal is stretched both to the target dynamic range $[K_0\text{-}W_0]$, resulting in the grid $B_0$, and once to full dynamic range of the display $[K_{HDR}\text{-}W_{HDR}]$, resulting in the grid $B_{HDR}$. These two grids are adaptively mixed into the final grid $B_{mapped}$ using a mixing map M prior to slicing (interpolation):

$$B_{mapped} = MB_{HDR} + (1-M)B_0.$$

Note that in this example ail the above operations are performed on a grid base, which is a heavily sub-sampled representation of the image, and hence are numerically inexpensive. The final output on full resolution is constructed by means of slicing into the mapped bilateral grid $B_{mapped}$. To create the mixing map M, we adopt the following approach 1. Construct the regional cumulative histogram by summing the existing local histograms, 2. Establish the brightness $I_{threshold}$ above which less than n percent of image pixels reside. In other words the top n percent of luminance values, 3. Count (on a local basis) the amount of pixels n with intensities higher than $I_{threshold}$.

4. Apply a morphological dilatation filter to create spatial consistency between neighboring bins, resulting in a consistency value $C_0$. If the consistency value is high, relatively large bright areas are present, if the consistency value is small, small bright areas are present, 5. Compute a mixing factor M. The value of the mapping function M is set to 1 for regions where the number of qualifying pixels is below a predefined threshold T (small highlights and thus to be mixed in) and falls off to 0 above this threshold to prevent large bright image portions from becoming unpleasantly bright;

$$M(C_0) = \begin{cases} 1 & \text{for } C_0 \leq T \\ \text{CLIP}(1-((C_0-T)/2T), [0,1]) & \text{for } C_0 > T \end{cases}$$

FIGS. 4a to 4f illustrate the effects of a dynamic range extension algorithm as described above. Shown are (a) a simulated LDR input image, as well as the (b) regional contrast layer and (c) detail layer extracted by means of bilateral grid filtering. The natural appearance of the scene after extension is maintained by (d) extending only the regional contrast VRC to a user or manufacturer defined range $[K_0\text{-}W_0]$. In (e), the intermediate output (sum of frames (c) and (d)) is shown. In (f), the final mapped, output is shown in which small specular highlights are identified to fill up the remaining available dynamic range.

Figure 5:
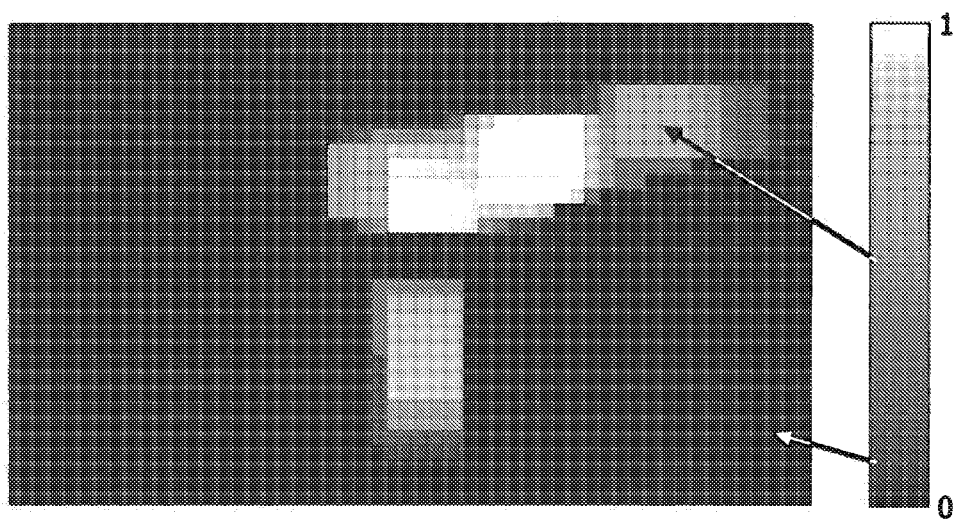
FIG. 5 illustrates a mixing map.

FIG. 5 illustrates the mixing map computed for the image of FIGS. 4a to 4f. The scale on the right hand side gives the mixing factor M. Some typical areas of mixing factor are indicated by arrows. The bright reflection in the water and the bright areas in the clouds are both correctly detected as small highlights and are mapped on the full dynamic range or near the full dynamic range of the HDR display device. Because the bright area in the sky is relatively large, a smaller weight (smaller mixing factor M) is attributed to this area to prevent it from becoming unpleasant on a high-brightness HDR display. Second the low-resolution nature of the map is clearly visible from its blocky appearance, because these operations are performed over local histograms, not on full pixel resolution. In this preferred embodiment the mixing map M is applied to the bilateral grids $B_0$ and $B_{HDR}$. The pixels themselves are constructed by slicing the final grid $B_{mapped}$. As a result, only bright pixels in the enhanced area are affected by the highlighting operation, but dark to mid-grey intensities remain unchanged, such that, the highlighting procedure is a selective operation to fill up the top part HL of the available dynamic range. The final output for the image of FIG. 3a is shown in FIG. 3f. The bright reflections in the water and in the clouds are now mapped to the peak brightness of the display, (i.e. mixing factor M is near 1, these areas are indicated in FIG. 5 by the white arrows, while larger areas in the sky remain closer to the intermediate intensities of FIG. 3e. Again, by preventing over-enhancement of fine detail contrast a more natural appearance of the scene is maintained.

Figure 6:
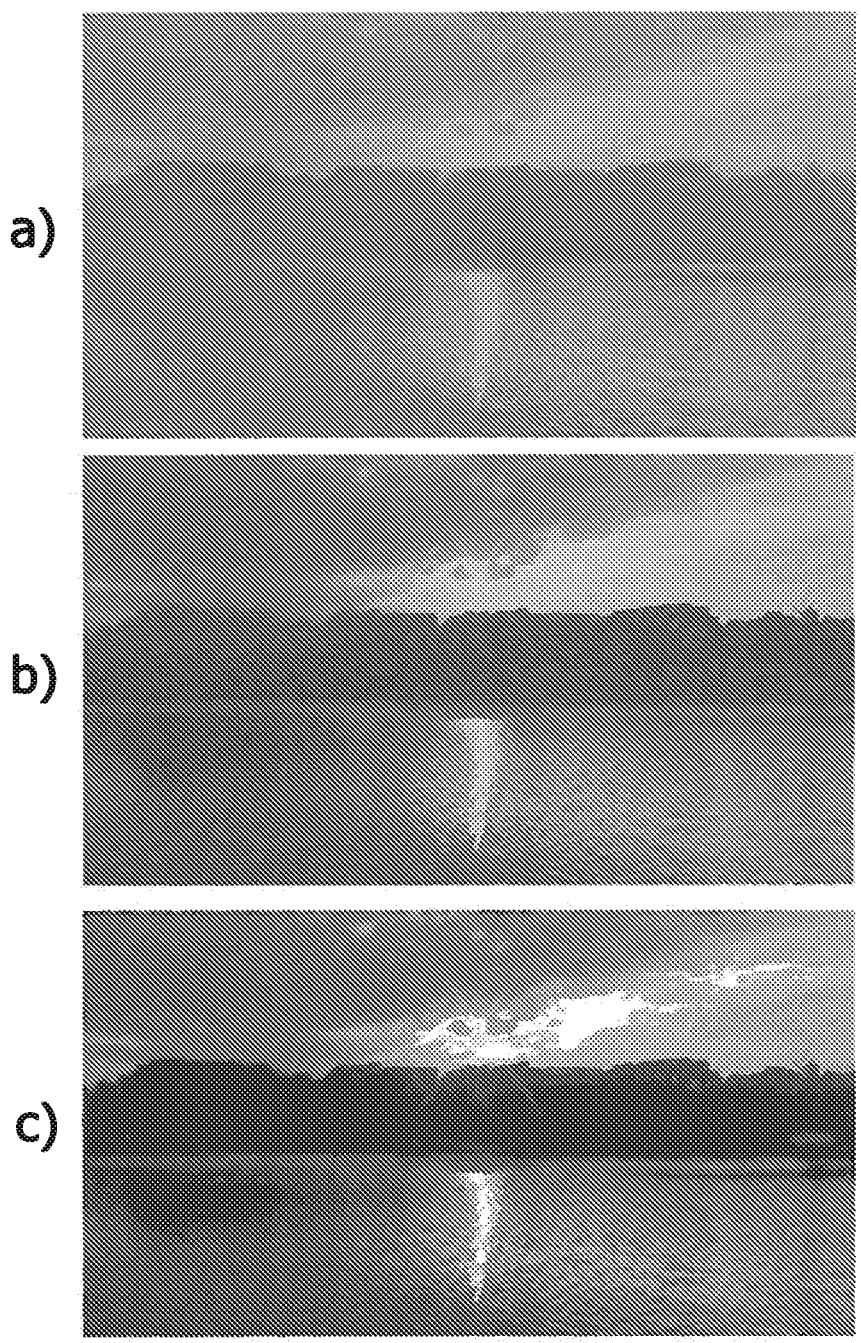
FIGS. 6a to 6c further illustrate dynamic range extension according to the invention.
Figure 7:
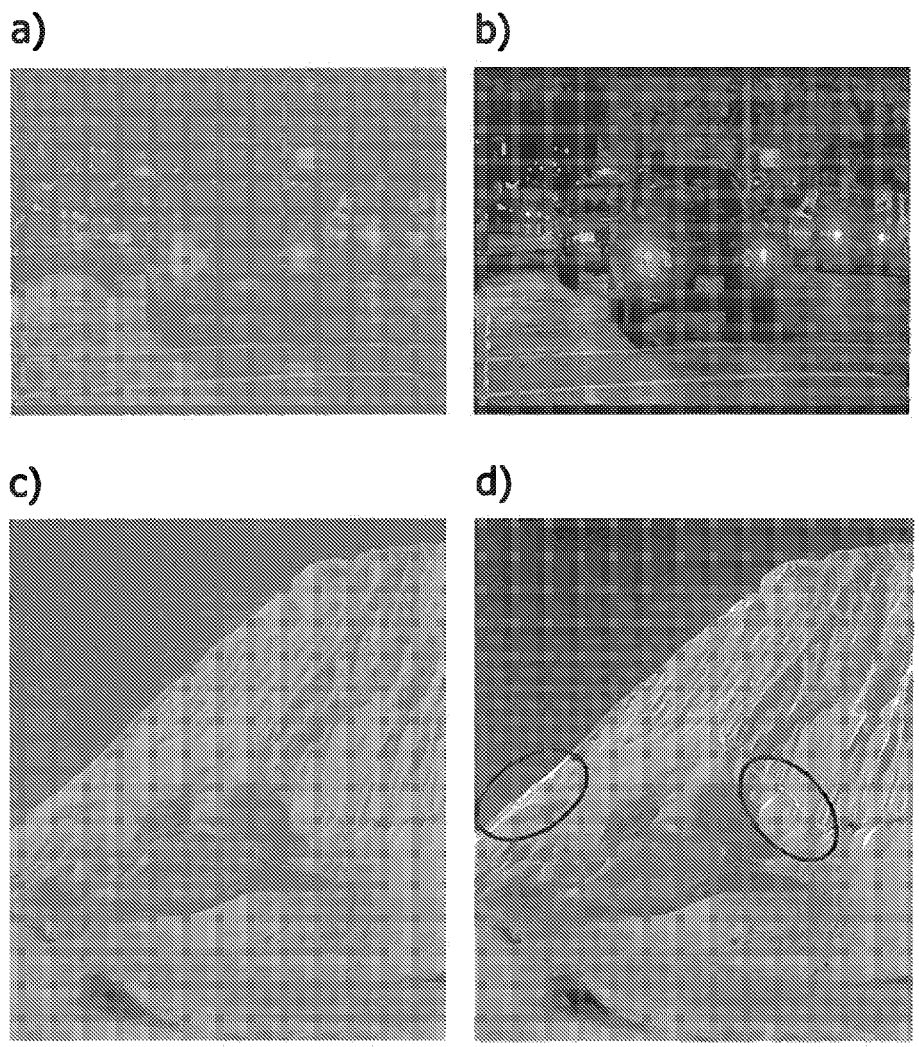
FIG. 7a to 7d and 8a to 8d provide further examples of dynamic range extension according to the invention.
Figure 8:
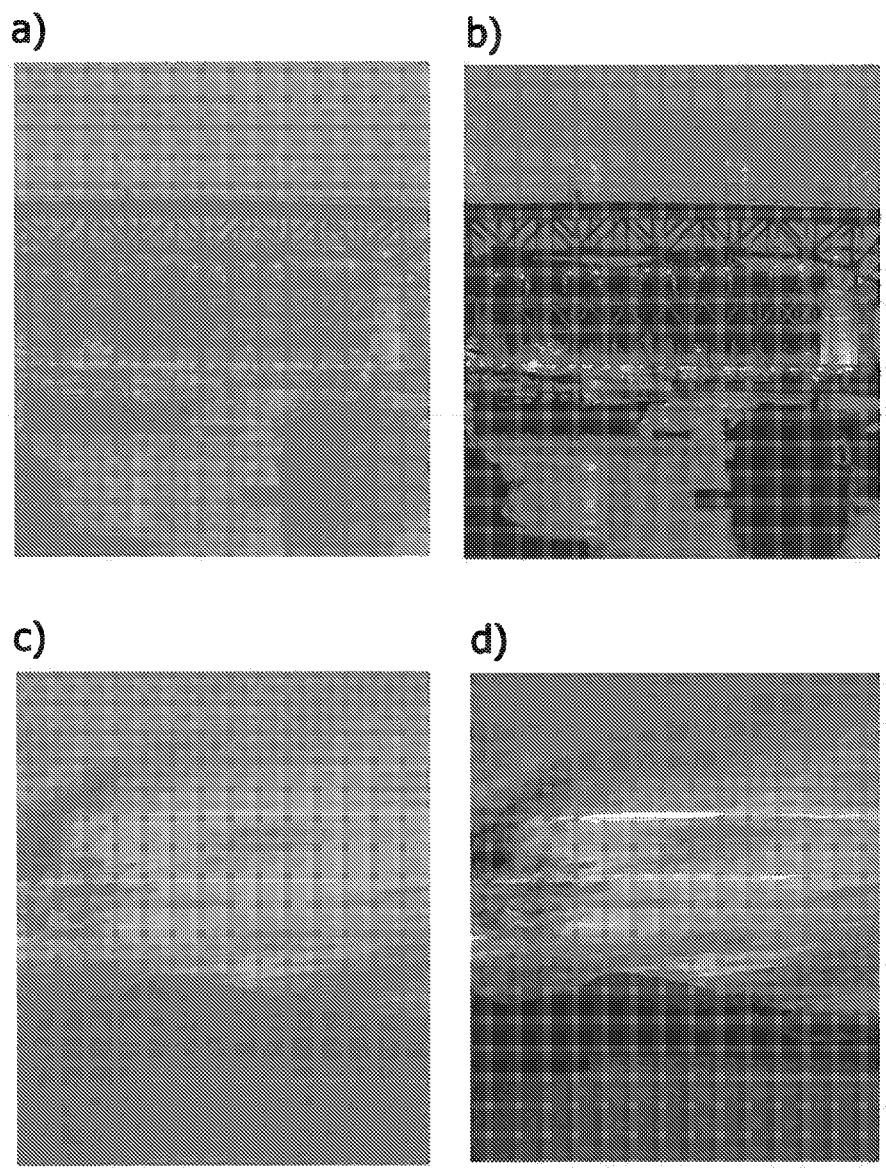

FIGS. 6-8 show further examples of the performance of the proposed dynamic range extension method. FIGS. 6a to 6c form an illustration of dynamic range extension. Shown are (a) the simulated LDR image and the extended output (b) without and (c) with highlighting. Again, this method is designed for giving a high performance on extremely bright HDR displays. Without such displays, we are here limited to simulations of the extension procedure. To this end, a LDR input is simulated and the extension procedure is used to restore the image to the full available range. Obviously, this simulation is imperfect and cannot provide a realistic appearance of the actual HDR display. Nevertheless FIGS. 6a to 6c illustrate the maintained balance between region and fine contrasts as well as the selective use of the peak brightness of the display.

FIGS. 7a to 7d show further examples of dynamic range extension. The simulated LDR images 7a and 7c are shown on the left, the extended HDR version including highlighting, images 7b and 7d, are shown on the right. In the lower example, ovals annotate highlighted areas. This example illustrates that the large white areas in the snowy mountain are not mapped to the peak brightness of the HDR display as this would be unpleasant. Instead, only small specular highlights are mapped to the full brightness in a very selective procedure. In the upper example only the car headlights are mapped to the peak brightness.

FIGS. 8a to 8e provide further examples of dynamic range extension. The simulated LDR images, FIGS. 8a and 8c are shown on the left, the extended HDR versions including highlighting are shown on the right in FIGS. 8a and 8d.

In short the invention can be described as providing a method, unit and display device in which the input image signal is split into a regional contrast signal and a detail signal, followed by stretching separately the dynamic ranges for both signals, wherein the dynamic range for the regional contrast signal is stretched with a higher stretch ratio than the dynamic range for the detail signal. Preferably the stretch ratio for the detail signal is near 1 or preferably 1. In preferred embodiment highlights are identified and for the highlights the dynamic range is stretched to an even higher degree than for the regional contrast signal.

Stretching the regional contrast signal more than the detail signal reduces mismatch between enhancement of fine details relative to regional contrast and provides a more natural look. The more extreme stretching of the dynamic range for highlighted areas maps these highlights in the top part of the dynamic range. This makes the image sparkle without causing large overly bright areas, which would provide for unpleasant viewing.

The methods and system of the invention may be used in various manners for various purposes such as for instance to enables enhancement algorithms and other video processing algorithms.

The invention is also embodied in a computer program comprising program code means for performing a method according to the present invention, when executed on a computer.

The invention can be used in or for conversion units of image signals and devices in which a conversion of image signals is used, such as display devices, in particular in display devices with HDR capability.

In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above.

The invention is not limited to the above given examples, but can be executed in various ways.

For example:

The upper value $W_0$ may be made dependent on a number of parameters, the most important of which are Color:

The maximum saturation, level for reflective red and blue colors is relatively low compared to green and yellow. The value for $W_0$ is, in preferred embodiments made dependent on the color, to avoid parts that start to glow rather than to blind.

Figure 9:
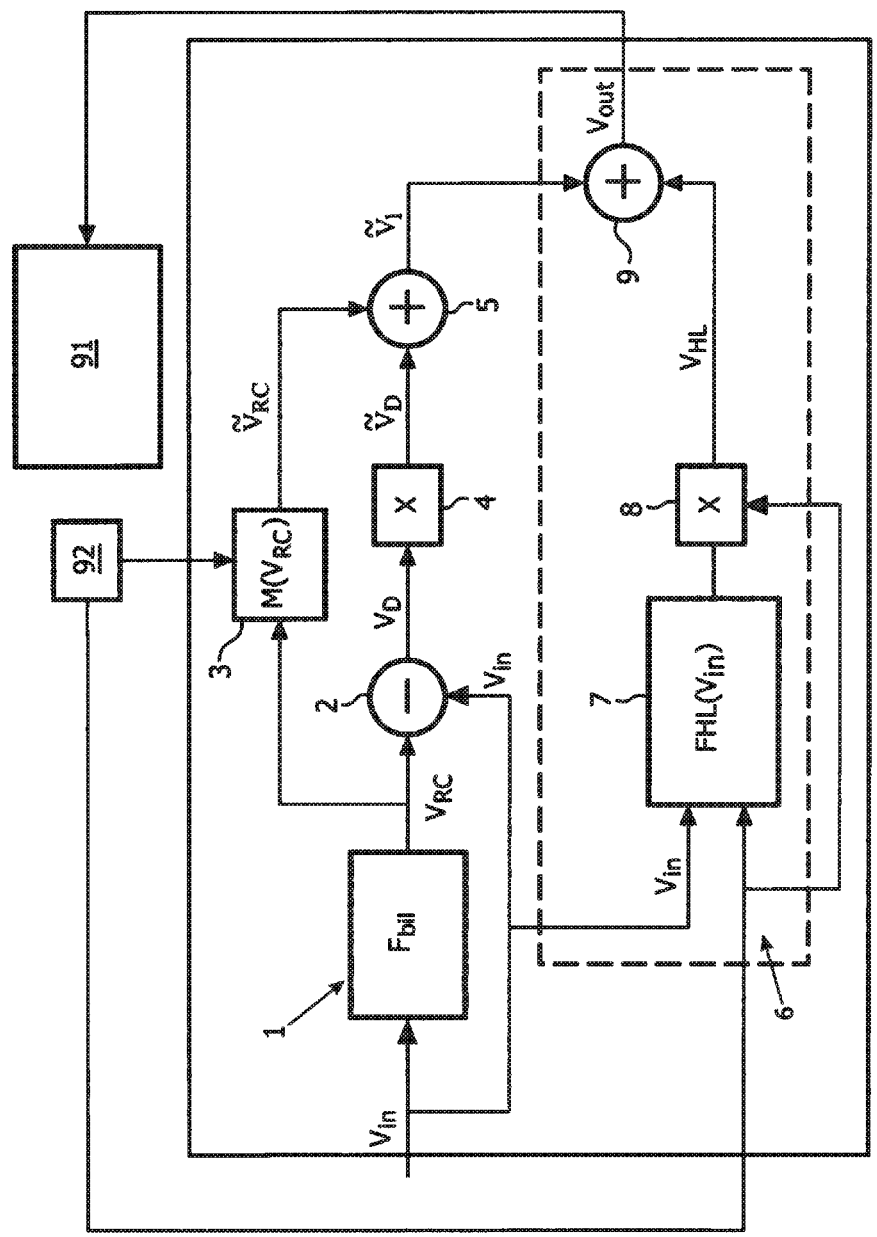
FIG. 9 illustrates a display device according to the present invention.

Ambient illumination level:

In preferred embodiments the display device is provided with a light sensor to sense the ambient illumination level. The output of the ambient illumination sensor determines the upper value $W_0$, wherein the higher the ambient illumination level, the higher the upper value $W_0$ is set FIG. 9 illustrates such an embodiment. The display device is provided with a display screen 91. The output signal $V_{out}$ determines the image displayed on the screen 91. The display device is further provided with an ambient illumination sensor 92 for measuring the ambient illumination. An output of this sensor is an input for the stretcher 3 for stretching the dynamic range of $Y_{RC}$. The output of this sensor may also be coupled to identifier 7 and/or the mapper 8 for determining the highlights and/or stretching providing the dynamic range for the highlights. In this example the output of sensor 92 is fed directly into identifier 7 and/or mapper 8. Within embodiments of the invention the functional parameters of stretcher 3 and identifier 7 and/or mapper 8 may be linked, so that the sensor signal could be sent to only one of the devices. Likewise, there could be a computer program comprising a look-up table wherein functional parameters for stretcher 3, such as the upper value of the dynamic range and/or distribution over the dynamic range and/or for identifier 7 and/or mapper 8 as a function of the sensor signal are stored. The output of the sensor is, in such embodiment, an input for the computer program and the computer program controls the parameters for stretcher 3, identifier 7 and/or mapper 8.

graphics detection

In preferred embodiments a graphics detection unit is used to identity graphics (such as logos, subtitles) to exclude them from enhancement and/or highlighting.

The invention is also embodied in various systems:

The image conversion unit can also form part of an image processing apparatus of various kinds.

For instance, the conversion unit for performing the conversion can be part of a display device, as in FIG. 9.

"Conversion unit" is to be broadly interpreted as any means, including software, hardware or any combination thereof for performing the method of conversion.

The conversion unit can also be part of for instance a recording device. One can record an image or video, wherein the recording device is provided with information on the capabilities of the display devices. The recording devices applies, in real time or of line, the method according to the invention, matching the dynamic range $W_0$-$K_0$ and/or $W_{HDR}$-$K_{HDR}$ to the capabilities of the display screen. The improved image or video can then be displayed, either in real time, or afterwards.

In a variation to this system, the software may be on some server on the internet. The user sends the image data of images or videos he/she has to an internet site and provides the internet site with details on the dynamic range capabilities of the display device he/she has. This dynamic range information can be explicit, for instance by specifying the dynamic range, or implicit, for instance by specifying the display device he/she has, or even without the user noticing it, since the type of display is automatically checked. At the server it is checked whether, given the capabilities of the display device, applying the method of the invention to the input image data an improved image or video is produced. If the answer is positive the method of the invention is applied to the input image data, and, after having received payment for the service, the improved output image data, matched to the capabilities of the HDR display, is sent back to the user.

This embodiment allows a user to upgrade his/her "old" image or videos, to make full use of the HDR capabilities of his/her newly bought HDR display without forcing the user to buy a specific conversion unit.

In "pay per view" systems, for instance to watch sport, the user may be given the option of buying standard quality, or upgraded quality, wherein the upgraded quality is matched to the dynamic range of the specific HDR display device he/she has.

The invention claimed is:

1. A method for converting input image data of an image into output image data comprising the acts of:

splitting the input image data into a first signal having a first dynamic range and a second signal having a second dynamic range;

stretching the first dynamic range of the first signal to provide a stretched first signal having a stretched dynamic range, wherein the stretched dynamic range of the stretched first signal is higher than the second dynamic range of the second signal;

combining the stretched first signal and the second signal to from a combined signal having a dynamic range bound by an upper value;

analyzing the input image data to identity groups of pixels forming highlights in the image;

converting pixel data for said identified groups of pixels into a third signal having a dynamic range extending upwards above the upper value to an upper maximum pixel value;

combining the third signal with the combined signal to form the output image data; and outputting the output image data.

2. The method of claim 1, wherein the second signal is made by subtracting the first signal from the image input data.

3. The method of claim 1, further comprising the act of stretching the second signal to form a stretched second signal for combining with the stretched first to form a stretched combined signal.

4. The method of claim 1, wherein an upper value of the dynamic range for the combined signal lies in a range corresponding to light intensities when displayed on a display of 500 to 1000 Nit.

5. The method of claim 1, wherein the upper maximum pixel value lies in a range corresponding to light intensities when displayed on a display of above 1000 Nit.

6. A non-transitory computer readable medium comprising computer instructions which, when executed by a computer, configure the computer to perform the acts of:

splitting input image data of an image into a first signal having a first dynamic range and a second signal having a second dynamic range;

stretching the first dynamic range of the first signal to provide a stretched first signal having a stretched dynamic range, wherein the stretched dynamic range of the stretched first signal is higher than the second dynamic range of the second signal;

combining the stretched first signal and the second signal to from a combined signal having a dynamic range bound by an upper value;

analyzing the input image data to identify groups of pixels forming highlights in the image;

converting pixel data for said identified groups of pixels into a third signal having a dynamic range extending upwards above the upper value to an upper maximum pixel value;

combining the third signal with the combined signal to form output image data; and outputting the output image data.

7. The non-transitory computer readable medium of claim 6, wherein the second signal is made by subtracting the first signal from the image input data.

8. An image conversion unit for converting input image data of an image into output image data, comprising:

a splitter configured to split the input image data into a first signal having a first dynamic range and a second signal having a second dynamic range;

a stretcher configured to stretch the first dynamic range of the first signal to provide a stretched first signal having a stretched dynamic range; wherein the stretched dynamic range of the stretched first signal is higher than the second dynamic range of the second signal;

a combiner configured to combine the stretched signal and the second signal to from a combined signal having a dynamic range hound by an upper value;

an identifier configured to analyze the input image signal and to identify groups of pixels forming highlights in the image;

a mapper configured to map pixel data for said identified groups of pixels into a third signal such that the third signal covers a dynamic range extending upwards above the said upper value to an upper maximum pixel value; and a further combiner configured to combine the third signal with the combined signal to form the output image data.

9. The image conversion unit of claim 8, wherein the second signal is made by subtracting the first signal from the image input data.

10. The image conversion unit of claim 8, wherein the stretcher is arranged such that the upper value of the dynamic range for the combined signal lies in a range corresponding to light intensifies when displayed on a display of 500 to 1000 Nit.

11. The image conversion unit of claim 8, wherein the mapper is arranged such that the upper maximum pixel value lies in a range corresponding to light intensities when displayed on a display of above 1000 Nit.

12. A display device comprising an image processing apparatus comprising;

a receiver configured to receive input image data of an image;

an image conversion unit configured to convert the input image data into output image data; and a display screen configured to render the output image data, wherein, the image conversion unit comprises:

a splitter configured to split the input image data into a first signal having a first dynamic range and a second signal having a second dynamic range;

a stretcher configured to stretch the first dynamic range of the first signal to provide a stretched first signal having a stretched dynamic range, wherein the stretched dynamic range of the stretched first signal is higher than the second dynamic range of the second signal;

a combiner configured to combine the stretched signal and the second signal to from a combined signal having a dynamic range bound by an upper value;

an identifier configured to analyze the input image data and to identify groups of pixels forming highlights in the image;

a mapper configured to map pixel data for said identified groups of pixels into a third signal such that the third signal covers a dynamic range extending upwards above the said upper value to an upper maximum pixel value; and a further combiner configured to combine the third signal with the combined signal to form the output image data.

13. The display device of claim 12, wherein the upper maximum pixel value corresponds to a value at or near a maximum of the dynamic range of the display screen.

14. The display device of claim 12, wherein the display device comprises an ambient illumination sensor providing an output, wherein the output of the ambient illumination sensor is an input for the stretcher.

15. An image conversion unit for converting input image data of an image into output image data, comprising:

a splitter configured to split the input image data into a first signal and a second signal;

a stretcher configured to stretch the first signal and the second signal differently, wherein a dynamic range of the first signal is stretched to a first stretched dynamic range and a dynamic range of the second signal is stretched to a second stretched dynamic range, the first stretched dynamic range of the stretched first signal being higher than the second dynamic stretched range of the second signal; and a combiner configured to combine the stretched first and second signals to from a combined signal having a dynamic range bound by art upper value, wherein the combined signal is combined with a third signal having a third dynamic range higher than the upper value for forming the output image data.

16. The image conversion unit of claim 15, further comprising:
- an identifier configured to analyze the input image signal and to identify groups of pixels forming highlights in the image;
- a mapper configured to map pixel data for said identified groups of pixels into the third signal; and
- a further combiner configured to combine the third signal with the combined signal to form the output image data.

17. The image eon version unit of claim 15, wherein the second signal is formed by subtracting the first signal from the image input data.

18. An image conversion unit for converting input image data of an image into output image data, comprising;
- a splitter configured to split the input image data into a first signal having a first dynamic range and a second signal having a second dynamic range;
- a stretcher configured to stretch the first signal for changing the first dynamic range to a stretched dynamic range which is higher than the second dynamic range of the second signal; and
- a combiner configured to combine the stretched first and second signals to from a combined signal having a dynamic range bound by an upper value, wherein the combined signal is combined with a third signal having a third dynamic range higher than the upper value for forming the output image data.

19. The image conversion unit of claim 18, further comprising;
- an identifier configured to analyze the input image signal and to identify groups of pixels forming highlights in the image;
- a mapper configured to map pixel data for said identified groups of pixels into the third signal; and
- a further combiner configured to combine the third signal with the combined signal to form the output image data.

20. The image conversion unit of claim 18, wherein the second signal is formed by subtracting the first signal from the image input data.

* * * * *